United States Patent [19]

Anderson et al.

[11] Patent Number: 4,928,806
[45] Date of Patent: May 29, 1990

[54] SYSTEM FOR REMOVING A PALLET FROM A MOVING TRANSFER MECHANISM AND FOR ACCURATELY LOCKING THE PALLET AT A PRECISE LOCATION

[75] Inventors: Edmund J. Anderson, Minneapolis; Wayne P. Desrude, Brooklyn Park, both of Minn.

[73] Assignee: Honeywell Inc., Minneapolis, Minn.

[21] Appl. No.: 179,586

[22] Filed: Apr. 8, 1988

[51] Int. Cl.⁵ .............................................. B65G 47/22
[52] U.S. Cl. .................................. 198/345; 198/346.1
[58] Field of Search ................. 198/345, 346.1, 465.1, 198/465.2, 465.3, 803.01, 803.2

[56] References Cited

U.S. PATENT DOCUMENTS

| | | | |
|---|---|---|---|
| 3,476,231 | 11/1969 | Bower | 198/345 |
| 3,646,656 | 3/1972 | Zilahy et al. | |
| 3,650,373 | 3/1972 | Kern et al. | 198/465.3 X |
| 3,708,051 | 1/1973 | Dato et al. | 198/345 |
| 4,217,978 | 8/1980 | Stalker | |
| 4,255,077 | 3/1981 | Smith | |
| 4,257,513 | 3/1981 | Siarto | |
| 4,360,097 | 11/1982 | Brems | |
| 4,598,816 | 7/1986 | Kutzu et al. | 198/465.1 |
| 4,674,620 | 6/1987 | Inoue | 198/345 |

Primary Examiner—Robert J. Spar
Assistant Examiner—D. Glenn Dayoan
Attorney, Agent, or Firm—John P. Sumner; John S. Munday

[57] ABSTRACT

A system and method is provided to remove a pallet from a moving transfer mechanism and for accurately locking the pallet at a precise location. More specifically, the system and method permits very accurate location, positioning, lifting and locking of a pallet to permit work station functions on devices carried by the pallets. The system is particularly well suited for non-synchronous assembly line operations.

7 Claims, 5 Drawing Sheets

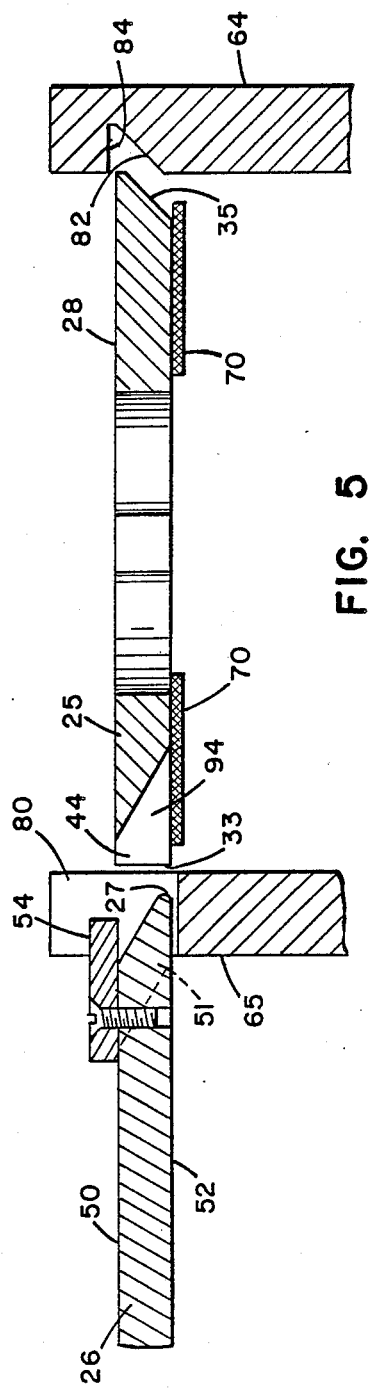
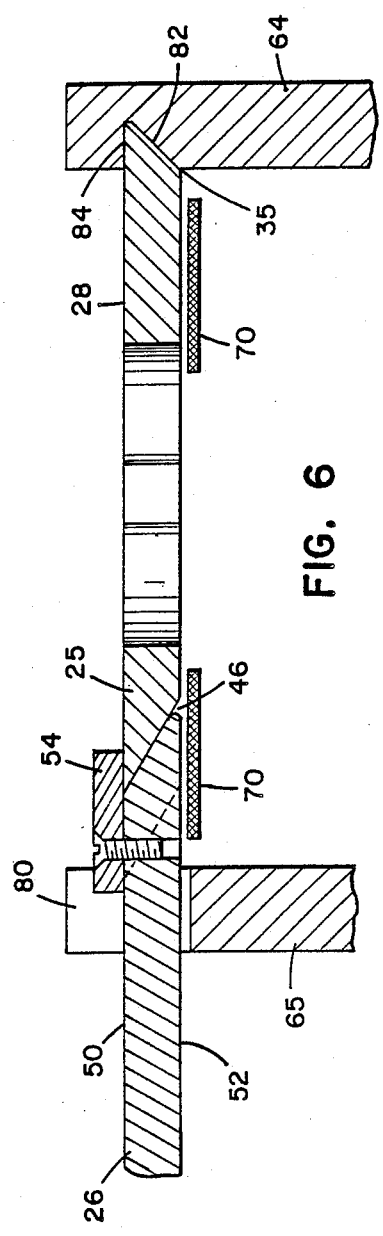

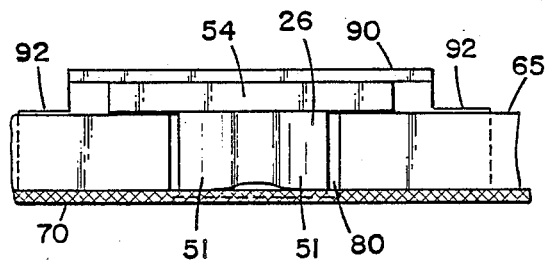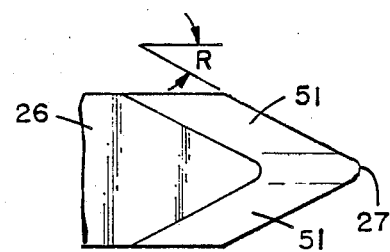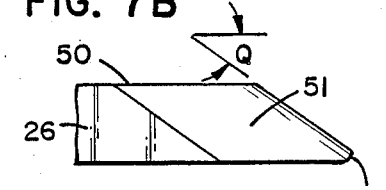
FIG. 7
FIG. 7B
FIG. 7A
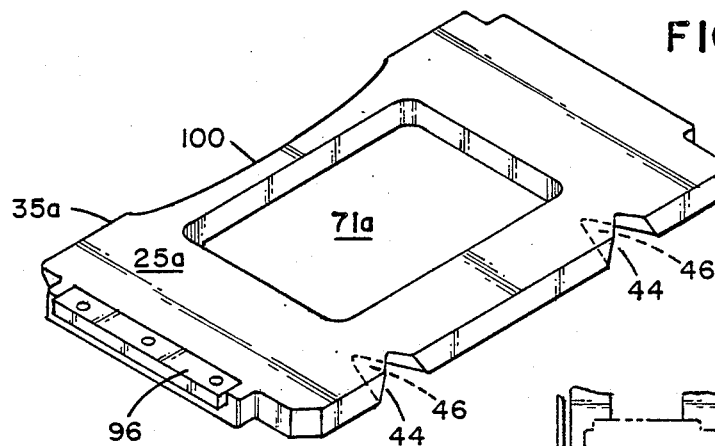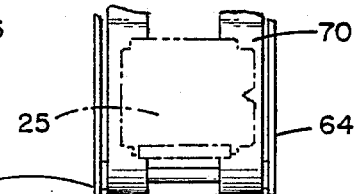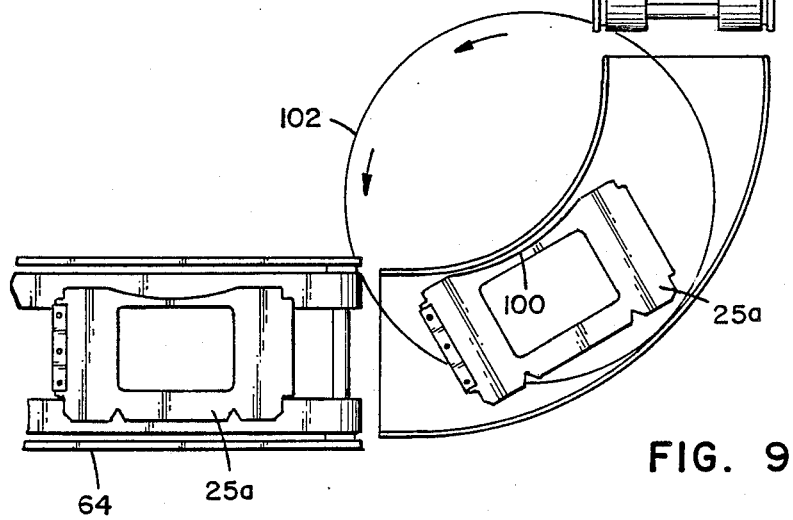
FIG. 8
FIG. 9

SYSTEM FOR REMOVING A PALLET FROM A MOVING TRANSFER MECHANISM AND FOR ACCURATELY LOCKING THE PALLET AT A PRECISE LOCATION

TECHNICAL FIELD OF THE INVENTION

The present invention relates generally to the field of pallet transfer and more specifically to a system and method to more accurately and efficiently localize and remove a pallet from a moving transfer mechanism.

BACKGROUND OF THE INVENTION

Within the field of pallet transfer, there exists a need for accurate and efficient location of moving pallets on a transfer mechanism. Such pallets may be employed as holding means for devices being constructed along an assembly line type of operation. For example, a device may be placed on a pallet moving along a transfer mechanism between numerous workstations. At each work station the device being held by the pallet receives discrete attention such as further assembly or testing.

In many cases, the efficiency of pallet transfer operations is highly dependent on movement of a high volume of pallets and associated devices during certain definable cycles. Typical operations may depend on assembly of tens of thousands of units during one week's time. Frequently such systems include workstations which are synchronously related, e.g., with efficiency dependent upon output of other workstations. Accordingly, synchronous operations are subject to systemwide inefficiencies when virtually any work station experiences difficulty or breakdown. Inefficiencies of merely a few seconds in time, or less, may result in substantial delays when such inefficiencies are multiplied many thousands of times as each device or unit experiences such delay. Thus, it is preferable to design assembly line pallet transfer systems utilizing a non-synchronous mode of operation.

Further delays in prior art pallet transfer systems are likely when pallets are being positioned at a workstation just prior to receiving a workstation function. Specifically, pallets which are not consistently precisely located relative to a workstation require workstation tooling with broader tolerances. Such lack of precision frequently results in timing delays and equipment wear. It is also common in such systems to employ relatively complex mechanical machinery to achieve proper alignment and positioning of a pallet.

One example of a machine for transferring pallets along a transfer mechanism is disclosed in U.S Pat. No. 3,646,656 issued Mar. 7, 1972, to Zilahy et al. The Zilahy et al patent discloses moveable carriers suspended on vertical rails in a cantilever relationship for support of the pallets. The carriers move on a continuous chain between workstations. The chain has wear plates which engage and frictionally drive the carriers until a mechanical brake mechanism disengages the carrier from the chain. Pallets which are mounted on top of the carriers are roughly positioned at various workstations and then more accurately located by spring loaded dual-acting arms which laterally move the pallets across the top surface of the carriers into a wedge-shaped member substantially opposite the spring loaded arms. Considerable mechanical inefficiencies are apparent in the Zilahy et al system due to the number of complex moving parts and the distances required for the pallet to be moved at workstations.

A different pallet transfer system which has been used by Honeywell Inc. in assembly operations includes a static roller system for synchronous movement of pallets through various workstations, with pallets transported between workstations on a belt conveyor device. At appropriate workstations, a metering system roughly locates standard width pallets, thus permitting a precise locating arm to engage each of the pallets in momentary locking and positioning relationship. Although the prior Honeywell system is preferable and advantageous over any other known synchronous system, the present invention permits even greater mechanical and timing efficiencies, as will be shown in the accompanying specification, claims, and drawings. Also, prior art problems experienced in systems such as Zilahy and the Honeywell system include jamming of engaging bars against misaligned pallets.

What has been needed, therefore, is a system for very precise and rapid locating of pallets positioned at a workstation along a moving pallet transfer mechanism. What has been further needed is a very precise pallet transfer and locating system which is mechanically efficient in operation as well as being non-synchronous so as to prevent systemwide inefficiencies.

What has been further needed is a pallet having a sidewall comprising an arcuate surface for cooperating with a curved guide rail at a corner portion of a pallet transfer mechanism in order to transfer the pallet around the corner portion of the transfer mechanism while maintaining the orientation of the pallet with respect to the direction of pallet transfer.

What has been further needed is a method to very precisely locate and transfer moving pallets from a moving transfer mechanism to permit efficient and accurate machining and other operations on devices located on the pallets.

SUMMARY OF THE INVENTION

The present invention is a system for removing a pallet from a moving transfer mechanism and for accurately locking the pallet at a precise location. The system comprises pallet means for supporting a workpiece. The pallet means has a first sidewall engaging surface and a second sidewall engaging surface as well as a top surface and a bottom surface. The system further comprises a transfer mechanism having at least one moving surface for supporting the bottom surface of the pallet means. The system includes guide rail means located above and adjacent to the transfer mechanism moving surface substantially along the length of the transfer mechanism. The guide rail means has a surface for guiding the travel of a substantially adjacent pallet means as the pallet means moves along the transfer mechanism moving surface. The system further comprises means for roughly locating a pallet means moving along the transfer mechanism and lift and lock means for lifting the roughly located pallet means from the transfer mechanism moving surface and for locking the pallet means into a precise location by applying forces against the first and second sidewall engaging surfaces.

BRIEF DESCRIPTION OF THE DRAWINGS

FIG. 5 is a side cross-sectional view taken generally along line 5—5, FIG. 3, the arrangement of the engaging bar shown in FIG. 5 being as it normally is in a preferred retracted position.

FIG. 6 is a side cross-sectional view taken generally along line 6—6, FIG. 4, the arrangement of the engaging bar and pallet being as they normally are when the engaging bar is in a preferred engaged position, thus lifting and locking a pallet in cooperation with a guide rail.

FIG. 7 is a front elevation view of a preferred embodiment engaging bar and guide rail cutout portion.

FIG. 7A is a side elevation view of a preferred embodiment engaging bar shown without a vertical stop.

FIG. 7B is a top plan view of a preferred embodiment engaging bar shown without a vertical stop.

FIG. 8 is a perspective view of an alternate preferred embodiment pallet having two receiving cavities and an arcuate groove in a second sidewall engaging surface.

FIG. 9 is a top plan view of a corner portion of a preferred pallet transfer system illustrating the alternate preferred embodiment pallet of FIG. 8 located on a transfer mechanism moving surface.

DETAILED DESCRIPTION WITH PREFERRED EMBODIMENTS

Detailed embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a basis for the claims and as a representative basis for teaching one skilled in the art to variously employ the present invention in virtually any appropriately detailed system or structure. It will be understood that in some instances relative material thicknesses and relative component sizes may be shown exaggerated, to facilitate an understanding of the invention.

Figure 1:
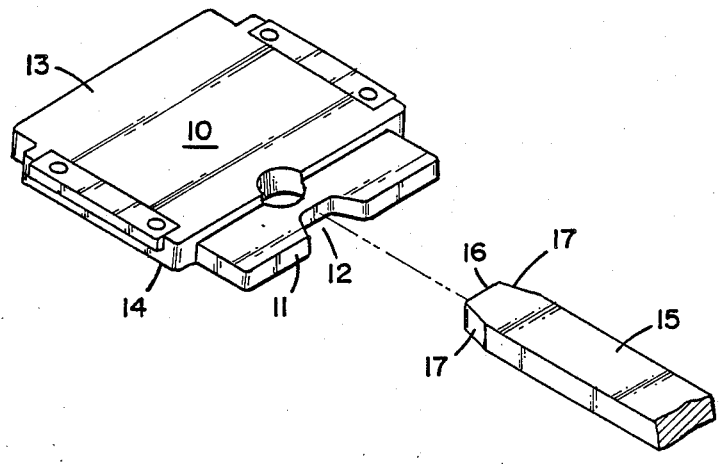
FIG. 1 is a prespective view of a prior art pallet and engaging bar.
Figure 2:
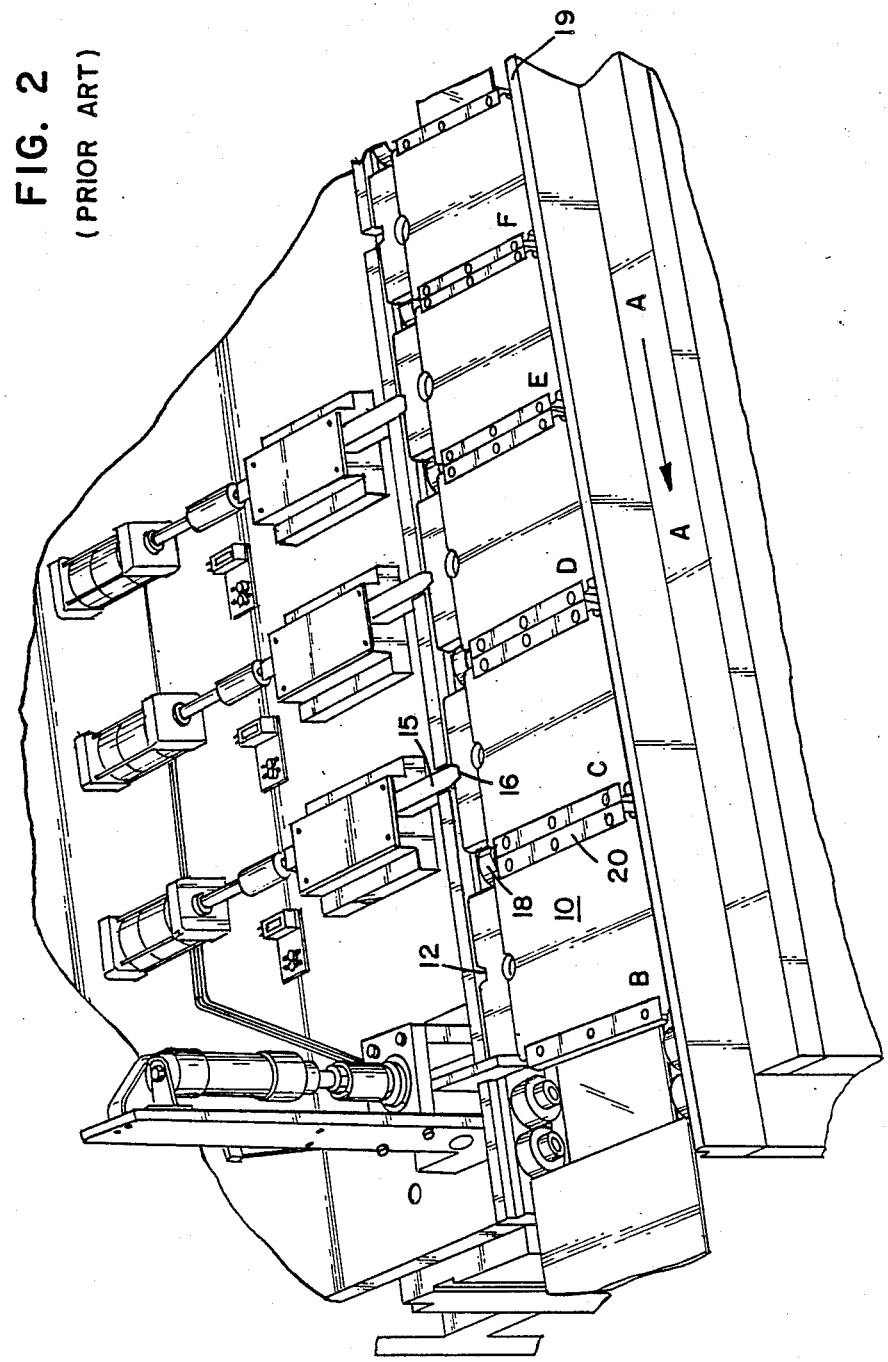
FIG. 2 is a fragmentary perspective view of a prior art system for locating pallets.

Referring to FIGS. 1-2, the reference numeral 10 generally designates a pallet of the prior art suitable for carrying a device along a pallet transfer mechanism between various workstations. In FIG. 1, prior art pallet 10 is shown having a first sidewall engaging surface 11, a slotted cavity 12, an upper surface 13, and a lower surface 14. Prior art pallet 10 first sidewall engaging surface 11 is constructed and arranged to receive an engaging bar 15. Engaging bar 15 of the prior art device shown includes a first engaging end 16 having tapered side surfaces 17. In operation, engaging bar 15 is actuated to a first extended position in which first engaging end 16 extends into slotted cavity 12 causing pallet 10 to be positioned for receipt of workstation functions.

FIG. 2 illustrates an exemplary prior art workstation showing a plurality of engaging bars 15 and pallets 10 positioned on a prior art roller-type transfer mechanism 18. As depicted, the various pallets 10 are moving along transfer mechanism 18 in the direction of line A—A. Movement of pallet 10 into positions for receipt of engaging bar first engaging end 16 is accomplished by the urging of stacked pallets 10 along transfer mechanism 18. For example, in FIG. 2, pallets 10 labeled C, D, and E are positioned at corresponding engaging bars 15 by the pushing effect of a plurality of pallets 10 represented by pallet F. Thus, when engaging bar 15 is in a first engaged position, first engaging end 16 protrudes into slotted cavity 12 of pallet 10. In such position, pallet 10 is in stationary relationship with transfer mechanism 18 and in butting relationship with a guide rail 19. Workstation functions may then be applied to pallet 10 or a workpiece mounted thereon. Pallet 10 also includes bumpers 20 which are constructed and arranged to prevent wear of pallet 10 through repetitive contact with other pallets 10 during normal use.

Although the prior art system depicted in FIG. 2 provides means for locating a workpiece on a pallet at a workstation, the system shown contains numerous inefficiencies. For example, backing up of pallets 10 to provide positioning force for other pallets 10 is an inefficient use of the pallets and the workpieces mounted on them. Moreover, excessive backing up of pallets 10 may occur due to malfunctioning equipment or other system problems. In other words, pallets 10 may continue to pile up behind malfunction sites until the backup causes jamming and shutdowns of otherwise operable workstations in the system. Further, if such a system is arranged around a single transfer mechanism, then entire system shutdowns may be necessary to correct malfunctions and/or pallet pile ups.

Figure 3:
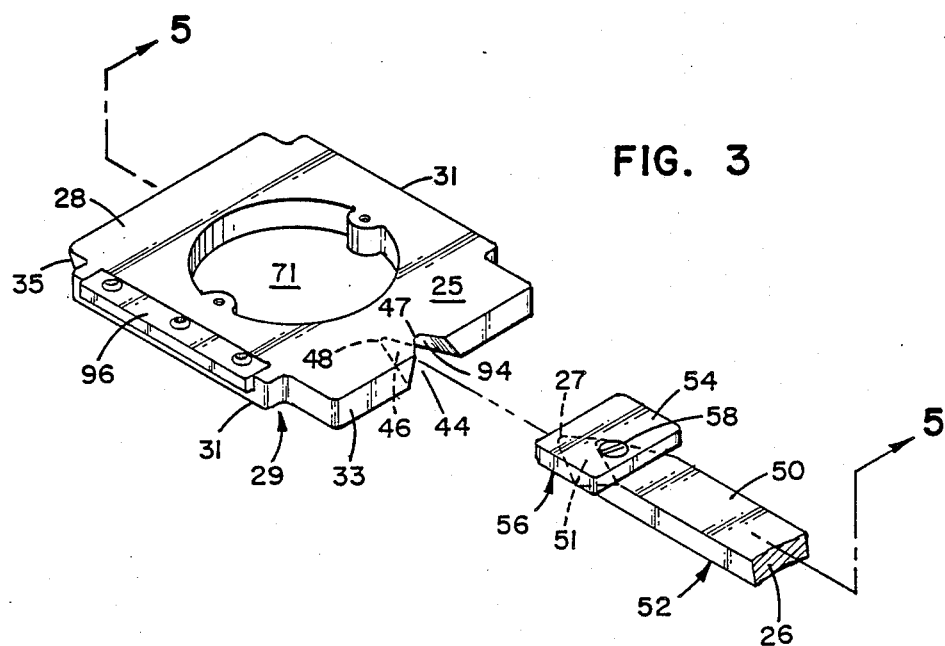
FIG. 3 is a perspective view of a preferred embodiment pallet and engaging bar of the present system, illustrating a compound angle of a preferred pallet receiving cavity and a preferred engaging bar first engaging end.

Referring to FIG. 3, a pallet means 25 and engaging bar 26 according to a preferred embodiment of the present invention are illustrated. Engaging bar 26 includes a first engaging end 27. Preferred pallet means 25 includes an upper surface 28, a lower surface 29, end surfaces 31, a first sidewall engaging surface 33, and a second sidewall engaging surface 35. Preferred pallet means 25 further comprises a tapered notch 44 defining a portion of the first sidewall engaging surface 33. Tapered notch 44 includes, in a preferred embodiment, a generally triangularly shaped opening in first sidewall engaging surface 33 and upper surface 28 permitting access to a receiving cavity 46. Preferred pallet means 25 second sidewall engaging surface 35 comprises an angled engaging surface shaped for conformal engagement with a guide rail that is positioned adjacent to a transfer mechanism.

Receiving cavity 46 preferably extends substantially from an outer portion of pallet means first sidewall engaging surface 33 angularly toward pallet means bottom surface 29. Receiving cavity 46 is preferably constructed and arranged to receive engaging bar first engaging end 27 when engaging bar 26 is actuated to a first engaged position.

Receiving cavity 46 is constructed and arranged to assist in the simultaneous lifting and aligning of pallet means 25 when engaging bar 26 first engaging end 27 is received in cavity 46. Receiving cavity 46 is preferably configured so that an upper apex portion 47 and a lower apex portion 48 have a width or radius which is less than the width or radius of engaging bar first engaging end 27. Thus, first engaging end 27 is preferably not in contact with pallet means 25 when engaging bar 26 is inserted in receiving cavity 46. Rather, other portions of engaging bar 26 preferably contact the inner sides of receiving cavity 46 and simultaneously impart vertical and horizontal lift to preferred pallet 25, as will be detailed further herein.

Referring to FIG. 1 and FIG. 3, it is shown that the blunt first engaging end 16 of prior art engaging bar 15 has a wide surface which risks jamming on or misaligning with prior art pallet 10. By contrast, first engaging end 27 of preferred engaging bar 26 comprises a compound triangular cross section for insertion into receiving cavity 46. This preferred structure reduces the risk of jamming and misalignment present in the prior art. In other words, the compound triangular shape of preferred engaging end 27 cooperates with triangularly shaped notch 44 to provide a significantly greater tolerance for alignment of preferred engaging bar 26 with preferred pallet 25. This greater alignment tolerance, and the simultaneous vertical and horizontal movement imparted to pallet means 25 by these preferred configurations, provides simple and efficient means for accurately removing a pallet from a moving transfer surface. Accordingly, substantial inefficiencies of known prior art pallet placement systems are overcome by tapered notch 44, compound angle-shaped receiving cavity 46, and compound angle-shaped engaging bar 26 of the present invention.

Engaging bar means according to the present invention, as shown in FIG. 3, comprises at least one elongated engaging bar 26 preferably positioned in a plane higher than that of a transfer mechanism associated with it. Engaging bar 26 is preferably actuable between a first engaged position at which engaging bar 26 extends toward pallet means 25 located on a transfer mechanism and a second non-engaged position at which engaging bar 26 is retracted away from pallet means 25. More particularly, preferred engaging bar 26 comprises an upper face 50, a first engaging end 27 having a generally triangular cross section, tapered and angled pallet engaging side surfaces 51, and a lower face 52 which extends beyond upper face 50 at first engaging end 27.

First engaging end 27 is preferably constructed and arranged for final conformal mating of pallet engaging side surfaces 51 with corresponding surfaces of receiving cavity 46 when pallet means 25 upper surface 28 is approximately co-planar with engaging bar upper face 50. Vertical stop means 54 is provided so that vertical movement of pallet means 25 is stopped at a predetermined point relative to first engaging end 27. Preferably, vertical stop means 54 includes a first surface 56 which protrudes beyond engaging bar upper face 50 at first engaging end 27. A preferred engaging bar 26 may comprise an integrally molded vertical stop means 54 or a separate vertical stop means or plate 54 fastened to engaging bar 26 by fastening means 58.

Figure 4:
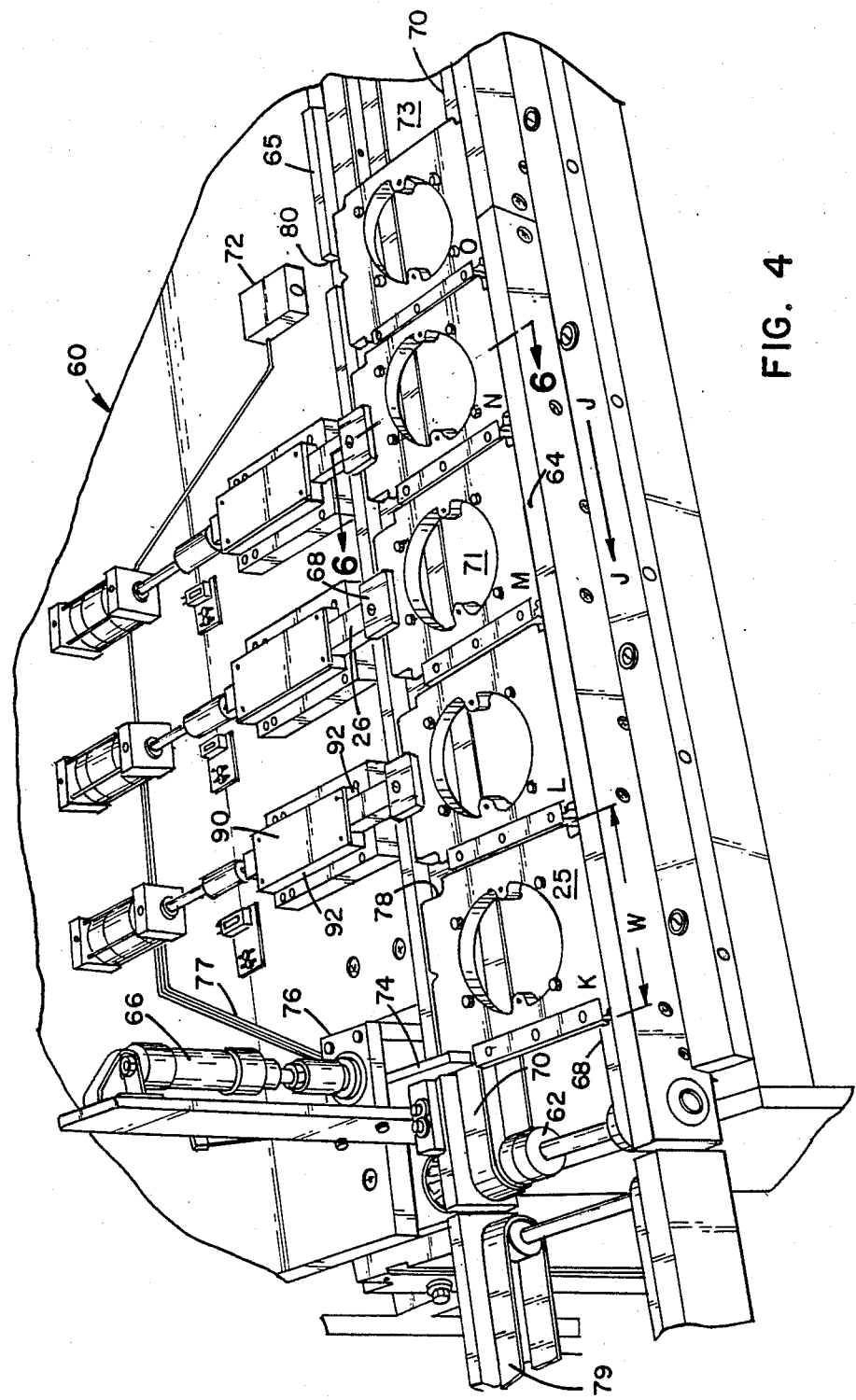
FIG. 4 is a fragmentary perspective view depicting a preferred system according to the present invention for accurately locating and lifting a pallet moving along a transfer mechanism.

FIG. 4 is a partial environmental illustration of a preferred pallet locating and lifting system 60 according to the present invention. As illustrated, system 60 includes a plurality of pallet means 25; a transfer mechanism 62; a pallet receiving member or guide rail means 64 located above and adjacent to transfer mechanism 62; rough locating means 66 for roughly locating pallet means 25 moving along transfer mechanism 62; and lift and lock means 68 for lifting pallet means 25 from transfer mechanism 62 and for locking pallet means 25 into a precise location.

As depicted in FIG. 4, transfer mechanism 62 includes at least one surface suitable for supporting pallet means 25 lower surface 29 thereon and for moving pallet means 25 in a direction indicated by line J—J. Preferably, a powered moving transfer mechanism in the form of a belt 70 is utilized although other moving surfaces, such as a reciprocating plate, could be employed. An optimal arrangement includes two spaced belts 70 which engage pallet means 25 lower surface 29. In its preferred configuration, the present system comprises lift and lock means for lifting and locking the pallet means into a precise location by applying force against preferred first and second sidewall engaging surfaces of the pallet means. This is in contrast to prior art systems which provide a locate and/or lift and lock function from below a pallet. Thus, by having a preferred opening 73 in the transfer mechanism between preferred spaced belt 70, as pallet means 25 is positioned at various workstations, access to workpieces mounted on pallet means 25 is possible from both above and below transfer mechanism belts 70. As is further illustrated in FIG. 4, pallet means 25 may be multi-sided with an aperture 71 defined by the sides of pallet means 25, and with aperture 71 extending from upper surface 28 through pallet means 25 to lower surface 29. Aperture 71 allows access from beneath transfer mechanism 62 to a workpiece carried on pallet means 25.

Substantial efficiencies are achieved through use of a system such as system 60 which permits workpiece access from both above and below transfer mechanism 62, and which operates in a non-synchronous normal mode. Non-synchronous operation is achieved in accordance with the present invention principally by cooperation of continuous transfer mechanism 62, rough locating means 66, and a plurality of pallet means 25, preferably of equal width W or an integer multiple of width W.

Rough locating means 66 permits rough location and alignment of pallet means 25 moving along transfer mechanism 62 moving belt 70. Rough locating means 66 of the present invention, which is similar to that used in the prior art system depicted in FIG. 1 and FIG. 3, preferably includes sensing means 72, a pallet means stop member 74; pallet means 25 of predetermined width W; and a metering system 76 for permitting selective movement of pallet means stop member 74. As shown in FIG. 4, several pallet means 25, labeled K, L, M, N, and O, of equal and predetermined width W are provided. A plurality of pallet means 25 of predetermined width W permits each one of pallet means 25 to have a predetermined reference point thereon roughly located a multiple distance of width W from pallet means stop member 74. Metering system 76 cooperates with sensing means 72, pallet means stop member 74 and predetermined width pallet means 25 to permit selective movement of pallet means stop member 74 between a first stop position and a second release position. Pallet means stop member 74 positioned at the first stop position prevents movement of pallet means 25 with transfer mechanism moving belts 70. When positioned in the first stop position, stop member 74 is lowered proximate to guide rail 65. In this position, stop member 74 receives pallet means 25 end surface 31. In the preferred embodiment, pallet means 25 contacts stop member 74 and movement of pallet means 25 along transfer mechanism belts 70 urges stop member 74 to move a pre-determined horizontal distance. Such horizontal movement by stop member 74 actuates switching and feedback means 77 within metering system 76, thus permitting engaging bars 26 each to move to an actuated position. As shown in FIG. 4, pallet means K has engaged stop member 74, thus actuating engaging bars 26 corresponding with pallet means L, M, and N. Rough locating means 66 has thus positioned pallet means 25 for application of lift and lock means 68 and for subsequent precision location for workstation functions.

As will be further detailed herein, lift and lock means 68 retains pallet means 25 in precise, predetermined locations during the time required to complete workstation functions. At the completion of workstation functions, pallet means 25 are returned to contact with belts 70 as engaging bars 26 retract away from pallet means 25.

In a preferred embodiment, sensing means 72 senses a pallet means 25 which is ready for positioning toward a workstation engaging bar, as depicted in FIG. 4 by pallet means O, and initiates appropriate sensing signals to metering system 76 via switching and feedback means 77. Various sensing means may be employed such as radio-frequency tags on each pallet means, optical sensing of each pallet means, or numerous other methods. The presence of a replacement pallet at sensing means 72 thereby permits stop member 74 to momentarily move vertically to a second release position. Momentarily raised stop member 74 allows abutting pallet means K to re-commence movement along moving belts 70. Preferably, stop member 74 attempts to lower to the first stop position as pallet means K passes beneath it. Stop member 74 then rides upper surface 28 of pallet means K until cut 78 is encountered and stop member 74 may fully lower to the first stop position. As pallet means L approaches stop member 74, the above-described cycle recommences and succeeding pallet means 25 are roughly located. Pallet means 25, such as pallet means K in FIG. 4, preferably proceeds via belts 70 or along conveyor means 79 to further workstations or system sites. Although transfer mechanism 62 and conveyor means 79 may be a unitary device, particular advantage may be achieved by utilizing independent devices. For example, substantial efficiencies may be realized by operating transfer mechanism 62 and conveyor means 79 at different speeds. Similarly, malfunctions in portions of system 60 which may involve a transfer mechanism 62 or a conveyor means 79 may be more readily repaired without incurring systemwide downtime when a plurality of transfer mechanisms are employed and a ready spare transfer mechanism or conveyor means is available for use.

In FIG. 4, pallet means L, M, and N are illustrated in lifted and locked positions relative to transfer mechanism moving belts 70, guide rail 64, and engaging bars 26. Lift and lock means 68 therefore removes pallet means 25 from contact with continuously moving belts 70 and accurately positions pallet means 25 for workstation functions such as assembly operation on a carried workpiece. Typical assembly operations may include placing of piece parts, screw setting, riveting, eyeletting, printing, staking, crimping, trimming, welding, soldering, forming, or calibration. Preferred system 60 minimizes pallet means 25 movement prior to precise positioning and does not rely on idle pallet means 25 which are necessary for pushing the pallet means of some prior art synchronous systems along transfer systems and at workstations. Thus, more workstations may be employed within system 60, and each workstation may function relatively independent of any preceeding workstations. The present system also permits access to a workpiece from above and below each pallet means 25 (via aperture 71 in each pallet means and via an opening 73 between belts 70), thereby further contributing to the efficiency of system 60. System 60 efficiency is principally dependent upon workstation cycle time, number of engaging bars 26 utilized and metering system 76 timing. However, minimizing unnecessary movement of pallet means 25 and/or other system components is also a key factor in improving cycle time. Accordingly, non-synchronous system 60 optimizes cycle time by utilizing pallet means 25 more efficiently than any prior art systems. This is particularly important because lost cycle time cannot be regained.

FIG. 5 and FIG. 6 each illustrate side elevational cross-sections of preferred embodiments of engaging bar 26, pallet means 25, transfer mechanism moving belts 70, and guide rail means 64, which in the preferred embodiment comprises both a front guide rail 65 and a rear guide rail 64. Referring to FIG. 5, engaging bar 26 is shown in a retracted position permitting free movement of pallet means 25 along transfer mechanism moving belts 70. As shown in FIG. 5 and FIG. 6, engaging bar first engaging end 27 is positioned slightly higher than moving belts 70. Also, vertical stop means 54 extends beyond pallet engaging bar upper face 50 over engaging bar first engaging end 27. Proximate each engaging bar 26, a cut out portion 80 of preferred front guide rail 65 permits movement of engaging bar 26 toward and away from pallet means 25.

A portion of preferred guide rail means 64 located opposite and farthest from engaging bar 26 comprises an angled receiving section 82 designed for contact with preferred pallet means 25 second sidewall engaging surface 35. Angled receiving section 82 is preferably constructed and arranged for lifting pallet means 25 from moving belts 70 when engaging bar 26 is actuated to the first engaged position into receiving cavity 46. Preferably, angled receiving section 82 cooperates with a generally horizontally oriented stop surface 84 to arrest vertical movement of pallet means 25.

In a preferred embodiment, as depicted for pallet means L, M, and N in FIG. 4, and as also depicted in FIG. 6, engaging bar 26 is actuated to the first engaged position in order to lift pallet means 25 from moving belts 70 and in order to lock pallet means 25 into precise position. Engaging bar 26 first engaged position comprises first engaging end 27 conformally inserted into tapered notch 44 and receiving cavity 46 of pallet means 25. As preferred angled pallet engaging side surfaces 51 preferably contact surfaces of pallet 25 defining receiving cavity 46, pallet means 25 is lifted vertically normal to belts 70 and pushed horizontally toward angled receiving section 82 of guide rail means 64.

At full extension of engaging bar 26, second sidewall engaging surface 35 of pallet means 25 preferably encounters angled receiving section 82 of guide rail means 64. The ramped and conformal relation of second sidewall engaging surface 35 and angled receiving section 82 encourages vertical movement of pallet means 25 in relation to guide rail means 64 until pallet means upper surface 28 contacts guide rail means stop surface 84. At such point, pallet means 25 is locked in stationary position between guide rail means 64 and engaging bar 26. In this configuration, transfer mechanism moving belts 70 are not in contact with pallet means 25 lower surface 29, thus facilitating non-synchronous operation of the entire system 60 while specified pallet means 25 receive workstation functions at various workstations.

In operation, system 60 is particularly advantageous over any known prior art system for several reasons. System 60 is preferably a non-synchronous pallet transfer system which does not subject pallet means 25 to the idle time or pushing functions to enter a workstation of prior art systems. Accordingly, more efficient use of pallet means 25 and mounted workpieces thereon is realized. The use of a powered transfer mechanism 62, and particularly a belt 70, permit means for moving pallet means 25 through system 60 essentially independent of other pallet means 25. Further, a workstation malfunction or slowdown will not normally impart systemwide shutdowns or delay in such a non-synchronous system utilizing a moving surface such as a plurality of belts 70 and/or conveyor means 79. Further, by having modular or separate transfer mechanisms 62 or conveyor means 79 throughout a larger system, improved replacement times are realized over prior art systems which use one continuous transfer mechanism such as one continuous chain or belt throughout an aray of multiple workstations.

Variable soft stop means may be employed along conveyor means 79 to delay or show the transfer of pallet means 25 between workstations if desired. As has previously been explained, substantial improvements are realized by system 60 through lift and lock means 68 accurately removing pallet means 25 from a powered, continuously moving transfer system 62. Further, as has also been explained, productivity of preferred system 60 includes lift and lock means 68 which actuates from a position on one side of transfer mechanism 62, thus allowing unobstructed access to a workpiece from above and below pallet means 25.

Efficiencies also accrue to system 60 due to the minimum distance of movement that is required of pallet means 25 in order to be lifted from moving surface 70 and into precise position. Moreover, this movement is efficiently imparted to pallet means 25 by a single linear stroke operation of engaging bar 26. Also, the compound angle structure of engaging bar first engaging end 27 and corresponding receiving cavity 46 of pallet means 25 permits simultaneous vertical and horizontal movement of pallet means 25 in response to horizontal movement of engaging bar 26.

Improved accuracies and substantial efficiencies are achieved when engaging bar 26 is precisely aligned in relation to a predetermined location along transfer mechanism 62. Indeed, system 60 lift and lock means 68 allows pallet means 25 to be repeatedly precisely located at each workstation within a tolerance of between 0.0015 inches and 0.002 inches (0.00381 and 0.00508 centimeters) in a horizontal plane parallel to transfer mechanism 62 moving belts 70. Values for precise placement of pallet means 25 in planes normal to belts 70 and in a z-axis plane of movement relative to belts 70 are even more precise due to the conformal mating of second sidewall engaging surface 35, angled receiving section 82, and guide rail means stop surface 84. Although various alignment means are available, a preferred embodiment of engaging bar 26 comprises an alignment member 90 as shown in FIG. 4 and FIG. 7. More particularly, engaging bar 26 preferably comprises at least two parallel surfaces defining guide walls 92 for precisely guiding engaging bar 26 into contact with pallet means 25. Also, as shown in FIG. 7, engaging bar 26 is positioned above the plane of transfer mechanism 62 moving surface or belt 70 to prevent jamming. Preferably, engaging bar lower face 52 is positioned generally between about 0.01 inches and 0.1 inches (0.0254–0.254 centimeters) higher than the plane of transfer mechanism 62 belt 70.

First engaging end 27 of engaging bar 26 may be slightly curled upward to assist in preventing undesirable engagement with any part of a transfer mechanism 62 moving surface or belt 70.

A detrimental adhesion of engaging bar 26 and receiving cavity 46 could result if the slope angles of the engaging bar angled pallet engaging side surfaces 51 were too sharp. It is preferable therefore to avoid a self-locking taper effect from sharp angles while also preventing jamming or poor lifting attributes resulting from blunt angles of contact between engaging bar 26 and pallet means 25. Referring then to FIG. 7A, angle Q depicts an optimum forward slope angle of engaging bar 26 first engaging end 27. A preferable range of values for angle Q may include generally between about 25° and about 35°. As implemented, an angle Q having a value of approximately 32° was found most preferable. Referring to FIG. 7B, angle R depicts an optimum side edge angle of engaging bar angled pallet engaging side surfaces 51. While a preferable range of values depends on functions to be performed, angle R may include values generally between about 15° and 25°. As implemented an angle R having a value of approximately 20° is most preferable. It is to be understood that various orientations of lifting and locking compound angles are envisioned according to system 60 while maintaining certain advantages and efficiencies.

Due to the repetitive contact of engaging bar angled pallet engaging side surfaces 51 and receiving cavity 46, an outer surface 94 of receiving cavity 46 may be formed of a material which is harder than the material forming the substantial remainder of pallet means 25, as illustrated in FIG. 3 and FIG. 5. The preferred harder material provides means for preventing any significant wear of pallet means 25 from contact with engaging bar 26. Preferred embodiments of pallet means 25 may include receiving cavity outer surfaces 94 constructed of materials such as anodized aluminum or hardened steel. Alternate approaches include hardening the surface of receiving cavity 46 or providing an insert of hardened material to form at least a portion of receiving cavity 46. Further advantage is achieved by utilizing pallet means 25 constructed of lightweight yet sturdy anodized aluminum which is impregnated with a lubricating material such as Teflon ® lubricant to facilitate its movement and minimize wear.

Structural testing of system 60 included wear analysis of an exemplary engaging bar 26 repeatedly actuated into an exemplary pallet means 25 for approximately 3.5 million cycles. No substantial wear occurred, and precision placement of pallet means 25 was maintained. Although wear life of such components in system 60 is expected to far exceed the truncated test analysis described herein, the existing data supports the productivity and system-wide reliability analysis underlying development of system 60. Greater endurance of pallet means 25 may be achieved by attachment of at least one non-metallic bumper 96 to an end surface 31 of each pallet means 25.

It is acknowledged that pallet means 25 may be comprised of various shapes in accordance with the present invention. An alternate embodiment pallet means 25a, illustrated in FIG. 8, includes a plurality of tapered notches 44 and receiving cavities 46, which represent a preferred configuration of lift and lock surfaces Pallet means 25a therefore preferably utilizes simultaneous lift and lock means 68 having at least two engaging bars 26. Pallet means 25a may further include arcuate groove means comprising an arcuate surface 100 located preferably in the second sidewall, which for use with the present system preferably also comprises a lift and lock surface 35a. Arcuate surface 100 permits use of elongated pallet means 25a on an identical width transfer mechanism 62 utilized by pallet means 25. Typically, such economical use of various sized pallet means is prohibited due to turning clearances at corner locations in assembly systems. As illustrated in FIG. 9, pallet means 25a arcuate surface 100 overcomes such difficulty by conforming to or wrapping around the curved shape of guide rail means 64 at a turn location having a rotating disk 102 or other moving surface, such as powered rollers or belts. Additionally, by maintaining a transfer mechanism 62 width which is optimal for variously sized pallet means, smaller sized pallet means 25 will not be as likely to jam or misalign due to excess side space between the pallet means 25 and the preferred front and rear guide rails of the present system. Accordingly, a further advantage of the present system includes transferring differently lengthed pallets around a corner portion of a moving transfer mechanism while maintaining the original orientation of the pallet with respect to the direction of pallet travel. This overcomes difficulties presented in prior art devices, such as slicers, which re-orient the pallets with respect to the guide rails as the pallets proceed through a corner portion of a transfer mechanism.

Substantial advantages are obtained in the present system from minimizing the distance required to lift and lock any-sized pallet means into a precise location. Accordingly, pallet means 25a solves a turning problem, it enhances the flexibility of system 60 operations, and it maintains the efficiency of lift and lock means 68 for variously lengthed pallet means. It should be noted that larger sized pallet means 25a may accommodate larger sized workpieces.

A method of removing a pallet from a moving transfer mechanism 62 and for accurately locking the pallet at a precise location may also be implemented, preferably utilizing system 60. A preferred method includes the step of roughly locating a pallet such as pallet means 25. An engaging bar 26 is then aligned in precise relationship to a predetermined location along transfer mechanism 62. The pallet is then engaged by aligned engaging bar 26 so that the pallet is lifted off of the moving surface such as belt 70 of transfer mechanism 62 and pushed into stationary conformal fit in an angled guide rail such as angled receiving section 82 of guide rail means 64. As previously explained with respect to system 60, this method provides greater efficiency and accuracy in the location, removal, and positioning of pallet means 25 along a transfer mechanism than has previously been available in the prior art. The method preferably further includes moveably mounting engaging bar 26 in cooperation with at least one fixed elongate alignment member 90 along which engaging bar 26 moves axially.

It is to be understood that while certain embodiments of the present invention have been illustrated and described, the invention is not to be limited to the specific forms or arrangements of parts described and shown above, since others skilled in the art may devise other embodiments still within the limits of the claims.

What is claimed is:

1. A system for removing a pallet from a moving transfer mechanism and for accurately locking the pallet at a precise location, the system comprising:
   (a) pallet means for supporting a workpiece, said pallet means including a first sidewall engaging surface and a second sidewall engaging surface, said pallet means further defining a receiving cavity on said first sidewall;
   (b) a transfer mechanism comprising at least one moving surface for supporting the bottom surface of the pallet means;
   (c) guide rail means located above and adjacent to said transfer mechanism moving surface substantially along the length of said mechanism, said guide rail means having a surface for guiding the travel of a substantially adjacent pallet means as the pallet means moves along the transfer mechanism moving surface;
   (d) means for roughly locating said pallet means moving along said transfer mechanism; and
   (e) lift and lock means for lifting said roughly located pallet means from said transfer mechanism moving surface and for locking said pallet means into a precise location by applying forces against said first and second sidewall surfaces, said lift and lock means including an engaging bar with a top and a pallet engaging end, said engaging end being formed by side surfaces depending from the top and having an intersection with a forward slope angle from said top and having a triangular cross section formed by the forward slope angle of the engaging bar engaging end and the angle between each side surface and the top of said engaging bar, said receiving cavity in said pallet means being configured for a substantially conformal fit with said triangular cross section, said receiving cavity being defined by said first sidewall and having an apex having a radius and said tapered engaging end of said engaging bar comprising a radius, such that said radius at the apex of said receiving cavity is less than said radius at said tapered engaging end of said engaging bar.

2. A system according to claim 1 in which the forward slope angle of the engaging bar engaging end is between about 25 degrees and about 35 degrees.

3. A system according to claim 1 in which the angle between the side surface and the top of said engaging bar is between about 15 degrees and about 25 degrees.

4. A system according to claim 1 in which said pallet includes two aligned pairs of said cavities and said engaging bars.

5. A system according to claim 1 in which said receiving cavity has an outer surface selected from anodized aluminum and hardened steel.

6. A system according to claim 1 wherein said guide rail means comprises a front guide rail facing said first sidewall engaging surface and a rear guide rail facing said second sidewall engaging surface.

7. A system according to claim 6 wherein said rear guide rail includes an angled receiving section designed for contact with said second sidewall engaging surface and for lifting said second sidewall engaging surface from said moving surface when said engaging bar is actuated.

* * * * *

UNITED STATES PATENT AND TRADEMARK OFFICE
CERTIFICATE OF CORRECTION

PATENT NO. : 4,928,806

DATED : May 29, 1990

INVENTOR(S) : Edmund J. Anderson and Wayne P. Desrude

It is certified that error appears in the above-identified patent and that said Letters Patent is hereby corrected as shown below:

The following claims 8, 9, 10, 11, and 12, should be added as shown on the attached page.

Signed and Sealed this

Third Day of September, 1991

Attest:

HARRY F. MANBECK, JR.

*Attesting Officer*

Commissioner of Patents and Trademarks

UNITED STATES PATENT AND TRADEMARK OFFICE
CERTIFICATE OF CORRECTION

PATENT NO. : 4,928,806

DATED : May 29, 1990

INVENTOR(S) : Edmund J. Anderson and Wayne P. Desrude

It is certified that error appears in the above-identified patent and that said Letters Patent is hereby corrected as shown below:

8. A compound triangular cross section pallet positioning system useful for lifting and locking a workpiece into a precise location comprising:
   (a) a pallet having a sidewall defining a receiving cavity; and
   (b) an engaging bar with a top and a pallet engaging end, said engaging end being formed by side surfaces depending from the top and having an intersection with a forward slope angle from said top and having a triangular cross section formed by the forward slope angle of the engaging bar engaging end and the angle between each side surface and the top of said engaging bar;
   (c) said receiving cavity being configured for a substantially conformal fit with said triangular cross section;
   (d) said receiving cavity being defined by said sidewall and having an apex having a radius and said tapered engaging end of said engaging bar comprising a radius, such that said radius at the apex of said receiving cavity is less than said radius at said tapered engaging end of said engaging bar.

9. A system according to claim 8 in which the forward slope angle of the engaging bar engaging end is between about 25 degrees and about 35 degrees.

10. A system according to claim 8 in which the angle between the side surface and the top of said engaging bar is between about 15 degrees and about 25 degrees.

11. A system according to claim 8 in which said pallet includes two aligned pairs of said cavities and said engaging bars.

12. A system according to claim 8 in which said receiving cavity has an outer surface selected from anodized aluminum and hardened steel.